Figure 1:
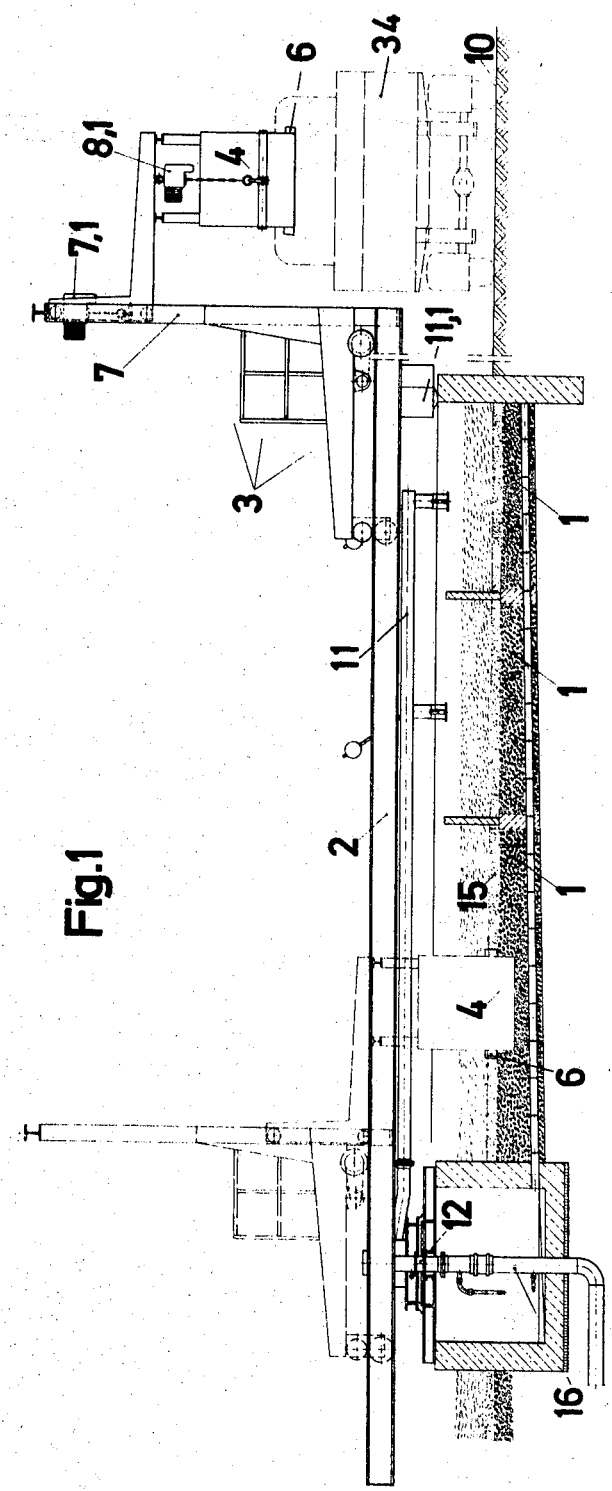

United States Patent

[11] 3,613,893

| [72] | Inventor | August Schreiber<br>Bahnhofstr. 45, 3001 Hannover-Vinnhorst, Germany |
|---|---|---|
| [21] | Appl. No. | 26,534 |
| [22] | Filed | Apr. 8, 1970 |
| [45] | Patented | Oct. 19, 1971 |
| [32] | Priority | Apr. 9, 1969, Apr. 9, 1969 |
| [33] | | Germany |
| [31] | | P 19 18 077.9 and P 19 18 078.0 |

[54] TREATING INSTALLATION FOR SLUDGE
12 Claims, 7 Drawing Figs.
[52] U.S. Cl. .................................................. 210/272,
210/152, 210/530
[51] Int. Cl. ........................................................ C02c 3/00
[50] Field of Search .......................................... 34/95, 204,
236; 210/270, 272, 523, 530, 152

[56] References Cited
UNITED STATES PATENTS

| 659,916 | 10/1900 | Davis ............................ | 210/270 X |
| 2,339,084 | 1/1944 | Lose ............................. | 210/272 X |
| 3,477,578 | 11/1969 | Bahr ............................. | 210/530 X |

FOREIGN PATENTS

| 1,189,538 | 4/1970 | Great Britain ............... | 210/152 |

Primary Examiner—Michael Rogers
Attorney—Watson, Cole, Grindle & Watson

ABSTRACT: The invention relates to an installation for the drying and composting of watery sludge of the type which is prepared from sewage and comprises drying and composting beds over which a removable bridge is rotatably mounted with a conveying bucket movably mounted on the bridge and having filling discharging devices to remove and load layers of the sludge on the composting beds.

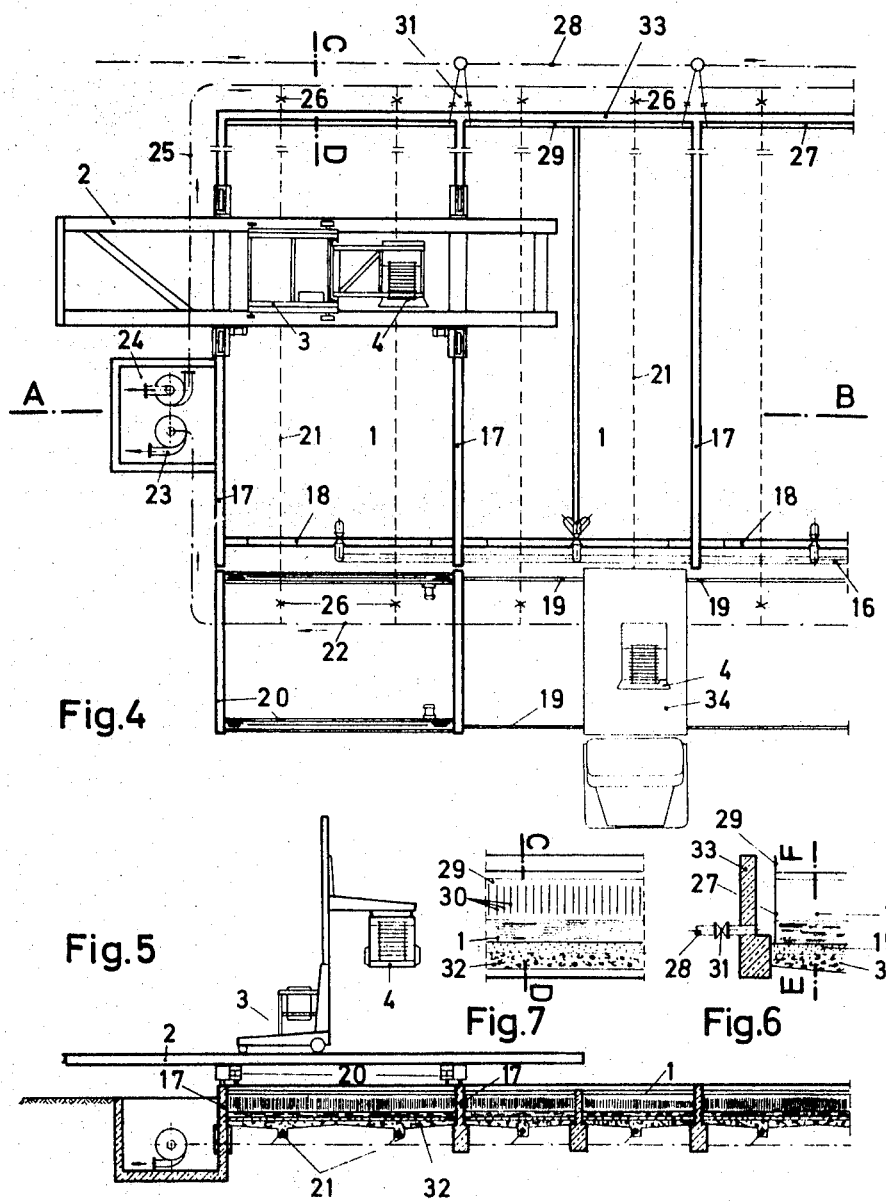

3,613,893

TREATING INSTALLATION FOR SLUDGE

This invention relates to an installation for the drying and composting of watery sludge especially sludge from sewage.

The invention relates to a sludge drying and composting installation consisting of sludge drying and composting beds and of a bridge movable across such beds, on which a conveyor trolley that can be moved in the longitudinal direction of the bridge has been provided.

Such installations are used to insert, smooth out and wash the filtering layers to remove the dried sludge from the drying beds, stack it outside the drying beds or to compost it and load it, and possibly to return again into said drying beds in even layers the dried and composted sludge or additive substances which were stacked outside the drying beds.

In the drying of water-containing sludge, the latter is conducted onto drained sludge-drying beds where the water will flow off partly by means of the filtering layers and drainage pipes provided in the sludge-drying beds and where it evaporates as to the other part. Large surfaces are needed for such drying process, and the expenditures connected with it for clearing manually become very large. Beyond that, the upper layers of sand become clogged in a relatively short time and must be removed from the drying beds and be replaced again by new filter layers. Hitherto, this work was carried out only manually and partly by machine and thus resulting in considerable expenditure. Furthermore however, the clogging of the layers of sand, since they could only be cleaned manually with great trouble and a large expenditure of time, is a further reason for the sludge-drying beds being needed in such large surfaces.

It has been known to arrange a bridge movable in the longitudinal direction of the beds above rectangular or round sludge-drying beds on which bridge a sludge removal arrangement has been provided, movable in a longitudinal direction. At the same time the sludge is picked up from the drying beds with the aid of the removal arrangement and is moved in a longitudinal direction of the bridge toward the outside, or else the removing device conveys into a bucket arranged movably on the bridge which is moved by itself or together with the sludge-removing arrangement up to one front surface of the bridge from where the sludge is placed onto a vehicle for transport or is stacked.

Also, round sludge-drying beds have been known which are similar in structure, on which a bridge mounted movably on an outside wall and rotatable in the center of the basin together with sludge-removing tools movable in the longitudinal direction of said bridge have been provided. The sludge in that case is also conveyed to the outside.

The present invention has for an object to create a sludge drying and composting installation of the initially mentioned type which will make it possible to pick up gravel stored outside the sludge-drying bed with a single tool and to insert it, spread it, and level it in even layers in the sludge drying beds to remove dried sludge from the sludge-drying beds in order to load it outside the sludge-drying beds, to stack it or to compost it and to insert again dried, stacked or composited sludge into the sludge-drying beds, or else to insert additive substances in the same manner which have been stored outside the beds.

For the solution of the foregoing, the present invention proposes in the case of a sludge drying and composting installation of the initially mentioned type, that the movable bridge on one side of its support projects over a composting bed and the transport trolley is provided with a movable conveying bucket that can be adjusted as to height and which is attached to the front side, and in which a filling and discharging installation has been built which makes possible the removal of dried or composited sludge from the compost beds as well as filtering material and additive substances, to load them, to deposit them by layers into the sludge or composting beds, and that on the bridge and/or on the transport trolley arrangements for roughing up and spreading and leveling the transported material, and for washing the filter are provided. Also the sludge and composting beds are equipped with drainage pipes for sucking off the sludge and for aerating the composting beds as well as to provide diverting pipes for muddy water of the freshly introduced sludge.

It is therefore a further object of the invention to excellently solve the problems. The possibilities achieved are of very considerable importance for the treatment of sludge in order to load it, to dry it, to compost it, to convert it, possibly also to improve it by additive substances, for example granulated calcium sulfate, limestone, phosphate slag, etc. Furthermore not only should the sludge be eliminated, but also a considerably shorter sludge-drying time should be achieved and the sludge should be disinfected by composting and, by the addition of additive substances, so that the fertilizing value of the sludge will be increased or it should be prepared for a thermal treatment or incineration.

The installation according to the invention makes it possible furthermore, that the conveying bucket provided according to the invention can pick up and discharge both inside and outside the sludge-drying bed. For picking up outside the sludge-drying bed, the transportation bucket is let down at the front side of the transport trolley moved out, whereby it moves downward past the front end of the bridge as a result of the above-mentioned front side arrangement. In order to pick up inside the sludge-drying bed, the conveying bucket may be let down in a simple manner right through the bridge which is provided with a corresponding longitudinal opening. In this case it is also essential that the conveying bucket be arranged at one frontal surface of the transportation trolley and that the bucket be provided with a built-in conveying installation for filling and discharging.

In order to achieve the drying in a still shorter time, the drainage pipes of the sludge drying and composting beds are equipped with installations for sucking off the sludge water, for aeration and ventilation of the drainage pipes, and installations for the diversion of muddy water will be provided. In the case of rectangular sludge-drying beds, the bridge can be moved in a longitudinal direction and in the case of round sludge-drying beds it is mounted rotatably around the center of the bed.

The conveying bucket is open in the direction of travel of the bridge and the filing and discharging arrangement, arranged on the open side and developed for example as a conveying belt or conveying chain, will move material to be conveyed for such a length of time on the open side into the conveying bucket, until said bucket is filled. Then the conveying bucket is moved to above a desired discharging place, is lowered on one side and the conveyed material is discharged again from the transport bucket to the desired spot, quickly or slowly, according to choice, by starting and moving the belt or the chains.

At the same time the filling and discharging installation and/or bridge can be moved more quickly or more slowly, so that the conveyed material will thus not be dumped at one position alone but can be distributed at a certain height in a layer. The front side arrangement of the conveying bucket with filling and discharging installation on the transport trolley is therefore particularly advantageous because a transport vehicle on the side of the bridge can be loaded without standing below the bridge.

Another advantageous characteristic consists therein, that devices have been arranged on the bridge and/or the transport trolley which rough up or plow up the sludge for a better air drying after it has been dried to a certain degree.

Furthermore, special arrangements adjustable in height can be provided on the bridge, either together or separately, with the plowlike devices for washing the upper filter layers after the sludge has been removed.

Figure 2:
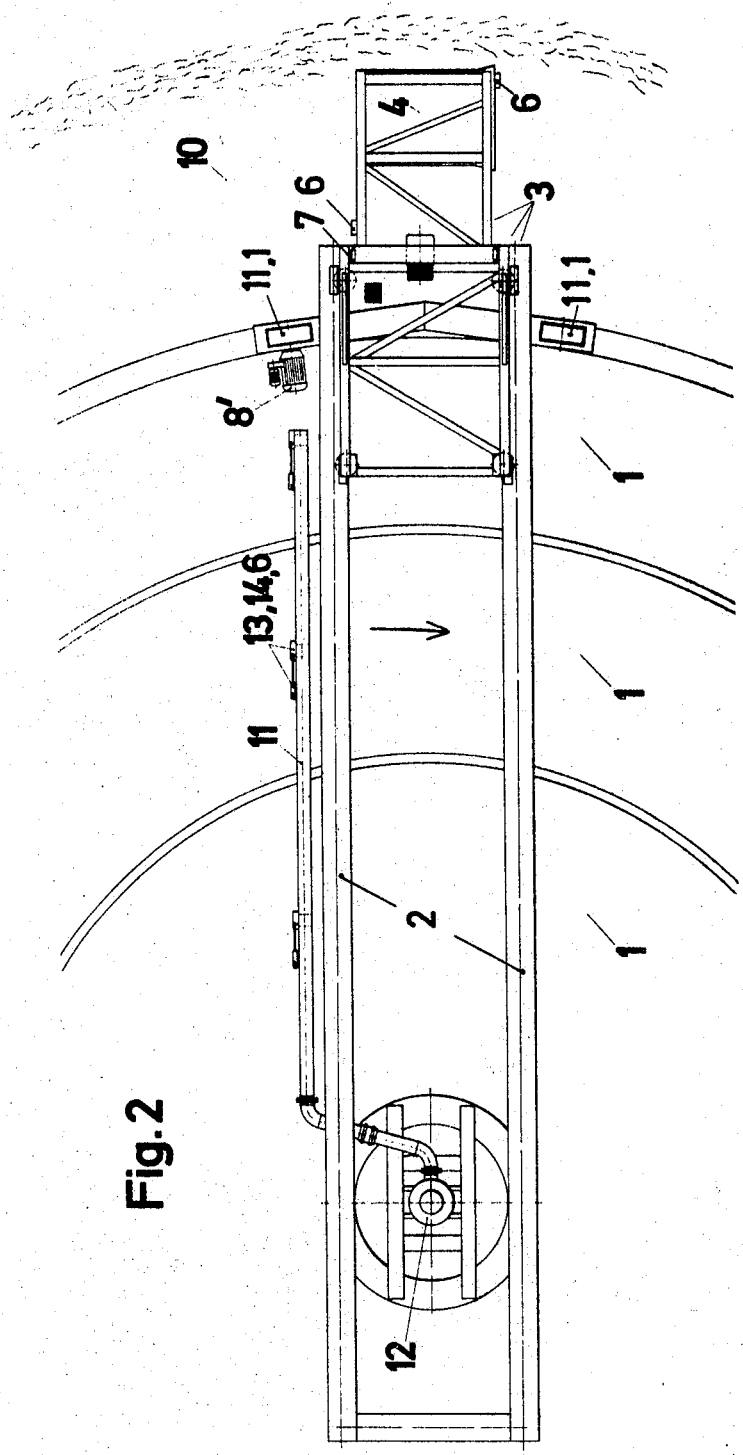
Figure 3:
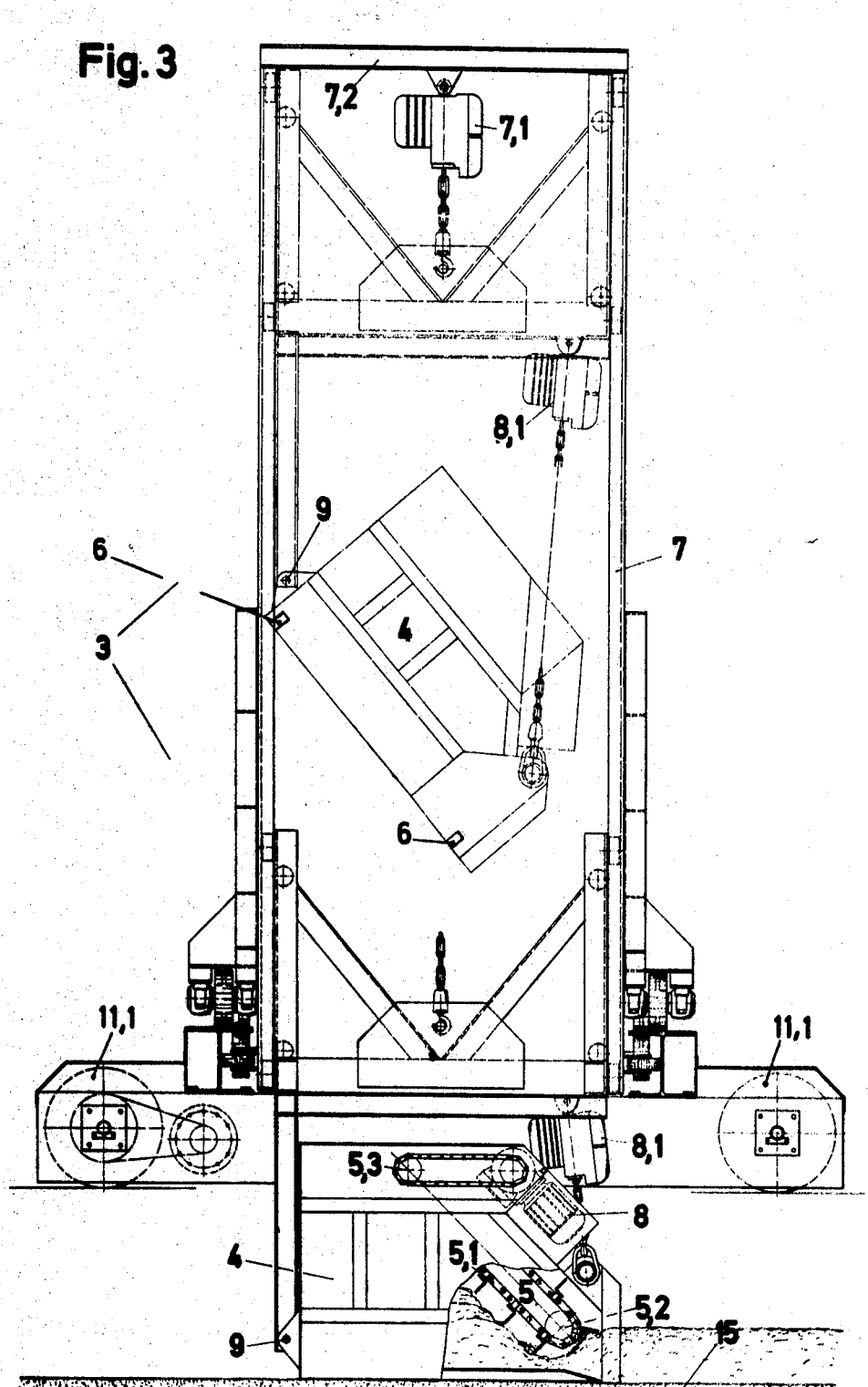

Further objects will be obvious from the description when considered in connection with the accompanying drawings in which;

FIG. 1 is a combined side elevation and section of a sludge drying and composting installation with round beds so that on the outside front surface of the transport trolley, a conveying bucket has been provided in the longitudinal section of the bridge, the left half of the round bridge being omitted, FIG. 2 is a top plan view of FIG. 1, FIG. 3 is a side elevation of the rotary bridge with transport trolley and conveying bucket, FIG. 4 is a top view of a partial sludge drying and composting installation with rectangular beds, FIG. 5 is a cross section of the installation according to FIG. 4, and taken on line A,B of FIG. 4, FIG. 6 is a vertical section through the front wall opposite the feed side, with narrow perpendicular slits for diversion of muddy water, and taken on line CD of FIG. 4 and CD of FIG. 7, and FIG. 7 is a vertical section through the sludge-drying beds taken on line EF in FIG. 6.

In the drawings the following numerals signify:

1 sludge drying or composting beds,
2 movable bridge,
3 transportation trolley traveling on bridge 2 in a longitudinal direction with
4 conveying bucket adjustable in height,
5 filling and discharging installation of the conveying bucket 4,
5.1 conveying belt or chain of the filling and discharging installation 5,
5.2 lower or upper guide roll for belt or chain 5.1, 5.3
6 installations for roughing, spreading and smoothing and washing of the transported material,
7 guides for the conveying bucket 4 adjustable in height,
7.1 lifting motor for the conveying bucket 4,
7.2 upper crossbeam of the guides 7,
8 variable driving motor as to speed for the filling and discharging installation 5,
8' driving motor for the movable bridge 2, variable as to speed,
8.1 motor for tipping the conveying bucket 4,
9 rotational axle for tipping the conveying bucket 4,
10 surface for composting and stacking of supplies, etc.
11 distributor pipe for the wet sludge on the rotary bridge 2,
11.1 rollers for the bridge 2,
12 pivotal point in the sludge drying round bed 1 for the rotary bridge 2,
13 pressure pipes for wet sludge in the case of rectangular beds,
14 installations for washing and spreading and smoothing of the filter layer 15,
15 filter layer,
16 pressure pipe for the feed-in of the wet sludge in the case of round beds,
17 longitudinal walls of rectangular sludge drying and composting beds 1 as support for the movable bridge 2,
18 front wall of the bed on the feed side,
19 rails,
20 transportation carriages for moving the bridge 2, inclusive of the transport trolley 3,
21 drainage-soak-in pipe,
22 tight diversion of the drainage pipe,
23 drain pipe for water and air,
24 aeration installation,
25 tight connecting pipe to the drainage-soak-in pipe 21,
26 slide in front of the drainage pipes,
27 open collecting gutter for the muddy water,
28 discharge pipe for muddy water,
29 plastic plate,
30 narrow, sludge-inhibiting perpendicular passage slits,
31 valve for drainage of the collecting gutter 27 for muddy water,
32 concrete bottom of the beds 1,
33 front wall of the beds on the discharge side for muddy water,
34 vehicle.

The FIGS. 1 to 3 illustrate an arrangement by way of example, as provided in the case of round beds. FIGS. 4 to 7 are arrangements with rectangular beds which on both longitudinal walls 17 have supports and a drive for moving the bridge 2.

As can be seen from FIGS. 1 to 3, the installation in the case of a round bed arrangement, has a bridge 2 which is mounted rotatably in and on the pivotal point 12 in the middle of the sludge-drying round bed. On an outside encircling wall the bridge is supported by rollers 11.1 one of which imparts a rotary movement to the bridge with the transportation trolley 3 and the conveying bucket 4 by means of a driving motor 8'. The direction of the arrow, shown for the revolution of the rotary bridge in FIG. 2 would be the movement for reception of the conveyed material.

The conveyor trolley 3 is provided movably in longitudinal direction on the bridge 2, which trolley has been mounted by way of wheels, of which at least two are driven. On the front side of the transport trolley 3, guides 7 have been provided in which a conveying bucket 4 can be moved up and down. In FIG. 1, the position of the transportation trolley 3 with the conveying bucket 4 is shown in such a way as is necessary for loading of the vehicle 34. In FIG. 1, the position of the transport trolley 3 with the conveying bucket 4 is shown as is necessary for the reception either of filtered material or of dried sludge from the sludge-drying bed 1.

In FIG. 2 the position of the transport trolley 3 with the conveying bucket 4 is presented in such a way as required for filling or discharging of transported material from the surface 10, which has been provided for the composting and stacking of supplies and loading.

In the conveying bucket a filling and discharging device 5 has been provided which consists either of a conveyor belt 5.1 provided with attachments or of two conveyor chains with drag strips built in between which are driven by the driving motor 8 by means of a lower guide roll 5.2 and an upper guide roll 5.3 in different directions. The conveying bucket 4 is open on the side of the guide rolls 5.2, whereby the opening is limited by the bottom of the conveying bucket 4 and the lateral surfaces.

The conveying bucket 4 as already indicated, is suspended by means of guides 7 movable in height by a lifting motor 7.1 which on its part is attached to an upper crossbeam 7.2 of the guides 7. By driving the motor 7.1 with automatic-locking drive, the conveying bucket 4 can be pulled up, lowered or held in a certain position in its guides 7 with the driving motor 8 for the filling and discharging device 5 and with a motor 8.1 provided for tipping the conveying bucket 4.

If the conveyed material is to be picked up, then the conveying bucket 4 must be brought up if possible in a horizontal position over the material to be transported or to it, and the filling and discharging device 5 must be put in motion. The conveyor belt 5.1 then scrapes the material to be transported into the conveying bucket 4. At the same time the material to be conveyed will pile up below the lower strand of the conveyor belt and will fill the conveying bucket 4 more and more behind said pileup. Then the filled conveying bucket 4 can be emptied either inside the sludge-drying bed 1 or outside the sludge-drying bed 1 above the surface 10 at any desired height.

The discharge takes place in such a way that the conveying bucket 4 is lowered on one side by the motor 8.1 by means of a lift and, at the same time, is tipped around the rotary axle 9. In the case of a tipping position which must be somewhat larger than the gliding angle of the contents of the conveying bucket 4, the conveyor belt 5.1 is shifted into a rotational direction which makes possible a scraping of the transported material from the conveying bucket 4 downwards or outwards. By means of a rapid movement of the conveyor belt 5.1 by a quicker or slower unilateral lifting of the conveying bucket 4 and a quicker revolution of the rotary bridge 2, the transported material is discharged or applied to a surface more rapidly or more slowly in a thinner or thicker layer from the conveying bucket 4 according to choice. If a relatively thin layer of the transported material must be inserted into the drying bed or placed onto the composting bed, then this may be accomplished by a quicker movement of the revolving rotary bridge 2, with the aid of the roller 8 driven by the driving motor 8' and/or with the aid of a rapid movement of the filling and discharging device 5 with the aid of the driving motor 8.

For a delivery of the wet sludge, a pressure pipe 11 has been provided which is connected rotatably through the pivotal point 12 in the central support to a perpendicular and fixed pressure pipe 13. In the pivotal point 12, additionally the electric current and the pressure water or hydraulic supply for the washing installations are guided thereby beside the rotatable connection for the wet sludge and are guided on the bridge 2 to the location 6 for use. An outlet opening may be provided for each pressure pipe 11 above each individual bed 1 which diverts the sludge to a certain bed while the other outlet openings remain closed.

On the rotary bridge 2 itself but also on the transportation trolley 3, installations 6 and 14 can be provided to dig up the upper layers of the sludge-drying beds 1 and which wash out the sludge which has penetrated with the help of water under pressure from the filtering layer 15 of the bed 1. Furthermore, roughing devices may also be provided at the same places, which rough up the upper surface of the wet sludge whenever it has discharged sufficient water of which produce a furrowed surface for an additional and improved drying in the air.

In the case of rectangular sludge drying beds 1 lying next to each other, the bridge 2 according to FIGS. 4 and 5 has been mounted movably on two longitudinal walls 17 which every time limit the width of the bed instead of on the central supporting pivotal point 12, and the support on the enclosing wall according to FIGS. 1 and 2. Beyond that in case of need, a few additional devices may be necessary in order to move the device possibly from one rectangular drying bed to another.

For this purpose rails 19 constituting a pair of rails arranged on one frontal surface of the beds at a distance from one another have been provided for a transporting carriage 20 for shifting of the bridge 2 together with the transport trolley 3 and the conveying bucket 4 from one bed to another. Effectively, the rails 19 will be provided on the front walls 18 of the beds from which the pressure pipe 16 for the wet sludge supply empties into the beds 1.

As becomes clear from FIGS. 4 and 5, drainage pipes 21 for draining have been provided at the deepest point of a concrete floor 32 forming the floor of the beds 1. Besides a ventilation and an aeration installation 23 and 24 has been arranged. The drainage pipes 21 consist of flexible, finely slotted or perforated plastic hoses or tubes, which are connected to a conveying installation 24 for the conveyance of water and air, by means of water and airtight connecting pipes 25. In front of the place of emptying of the drainage pipes 21 into the tight connecting pipe 25, slides 26 have been arranged.

In front of the front wall 33 of the bed, opposite the wet sludge feed pipe 16, plates 29 made of plastic material and forming a partitioning wall have been provided which are equipped with narrow perpendicular sludge inhibiting passage slits 30. The partitioning wall formed by the plates 29 on their part and together with the front plate 33 of the bed form an open collecting trough or gutter for muddy water which runs off by means of an outlet of the collecting channel 27 provided with a locking slide or valve 31 into a discharge pipe 28 for the muddy water.

I claim:

1. A treating installation for sludge and the like comprising sludge drying and composting beds, a bridge movable across the beds, a transport trolley on the bridge movable in longitudinal direction thereof, the movable bridge on one end of its support projecting beyond a composting bed, a conveying bucket movable and adjustable as to height, the transport trolley being provided with the bucket and having a filling and discharging device to remove, load and deposit layers of the sludge on the composting beds so that the dried or composted sludge from the composting beds as well as filtering material and additive substances will be deposited on the beds, means for roughing up, spreading and smoothing the transported material and for washing the filtering material on the bridge on the transport trolley, and the sludge and composting beds being provided with drainage pipes to run off the sludge water and to aerate the composting beds and diverting installations for the muddy water of the freshly brought in sludge.

2. A treating installation according to claim 1, in which guides are provided on one front side of the transport trolley, the guides and lifting device for the transport bucket and adjustable in height.

3. A treating installation according to claim 1, in which the movable bridge extends beyond the sludge-drying beds in the direction of the front side of the transport trolley bearing the conveying bucket and in which a plane for composting of the dried sludge and for the storing of gravel and other additive substances is provided under the bridge projection and the extended conveying bucket.

4. A treating installation according to claim 1, in which the bridge is provided above a round sludge-drying bed, said bridge being mounted on a central support around a pivotal point and on the encircling wall of the bed extended radially toward the outside beyond said bed so that the plane for composting and storage develops around an encompassing wall.

5. A treating installation according to claim 1, in which the movable bridge is provided in rectangular sludge-drying beds lying one beside the other, mounted movably on two longitudinal walls limiting the pertinent width of the bed, and in which on one front side rails are provided with a conveying carriage for displacing the bridge and inclusive of a transport trolley from one bed to another.

6. A treating installation according to claim !1, in which the filling and discharging device is a conveying chain arranged in the conveying bucket and having a driving motor which is variable in regard to speed and direction of rotation and which distributes, fills or discharges the transported material evenly over its entire width.

7. A treating installation according to claim 1, in which the conveying bucket is tiltable around a shaft connected firmly with guides and is mounted adjustably.

8. A treating installation according to claim 1, in which the movable bridge is provided with a driving motor with variable r.p.m. in cooperation with the drive of the filling and discharging installation of the conveying bucket and which is variable in regard to r.p.m. according to choice to provide a thinner or thicker layering of the sludge bed with dried sludge.

9. A treating installation according to claim 1, in which a wet sludge-distributing pressure pipe is provided for feeding wet sludge and which has been attached to the bridge connected rotatably in the pivotal point of the bridge with a fixed sludge pressure pipe and in which closable discharge openings are provided above the individual rings of the sludge-drying bed subdivided in the manner of rings.

10. A treating installation according to claim 1, in which a water pipe for washing and an electric cable is provided leading to a driving motor connected rotatably in the pivotal point of the bridge to fixed leads.

11. A treating installation according to claim 1, in which drainage pipes are provided for drainage arranged with an assigned aeration and ventilation installation at the deepest point of a concrete floor forming the floor of the beds, whereby the drainage pipes consist of flexible and finely slotted or perforated hoses which are connected by means of water and airtight hoses to a conveying installation for the conveyance of water and air.

12. A treating installation according to claim 1, in which plastic plates are provided forming a partitioning wall in front of the front wall of the bed opposite the wet sludge feed, said plates being provided with narrow and perpendicular sludge-inhibiting slits for passage of liquid and a wall of the bed together with this partitioning wall constituting an open collecting trough for carrying off of muddy water.